(No Model.)
W. H. DAVIES.
HORSESHOE CALK.
No. 585,187.  Patented June 29, 1897.
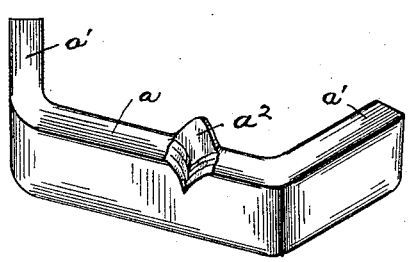
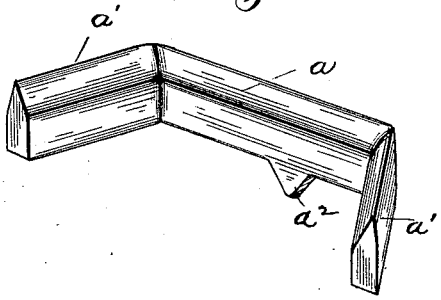
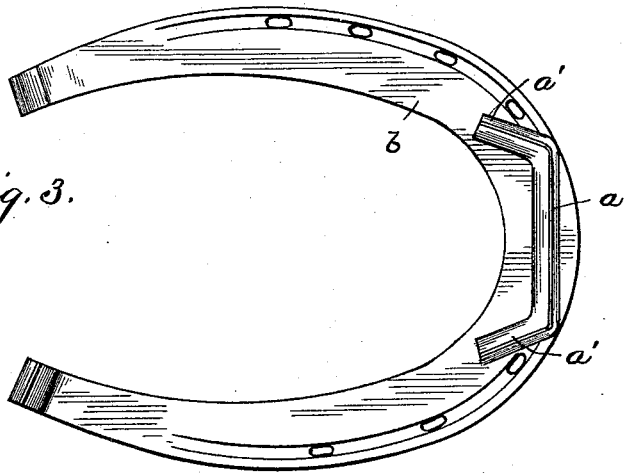
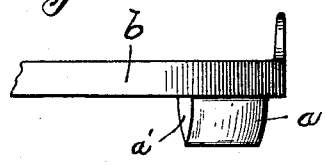
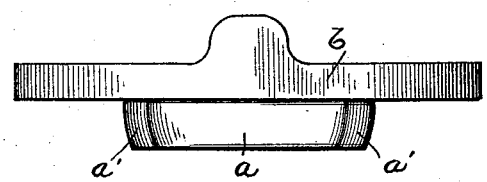
Witnesses:
W. J. Jacker.
Edward E. Pion.
Inventor:
William H. Davies
By W. Clyde Jones
Atty.

UNITED STATES PATENT OFFICE.

WILLIAM H. DAVIES, OF CHICAGO, ILLINOIS.

HORSESHOE-CALK.

SPECIFICATION forming part of Letters Patent No. 585,187, dated June 29, 1897.

Application filed July 20, 1896. Serial No. 599,854. (No model.)

*To all whom it may concern:*

Be it known that I, WILLIAM H. DAVIES, a citizen of the United States, residing at Chicago, in the county of Cook and State of Illinois, have invented a certain new and useful Improvement in Horseshoes and Toe-Calks Therefor, of which the following is a full, clear, concise, and exact description, reference being had to the accompanying drawings, forming a part of this specification.

My invention relates to an improved horseshoe and toe-calk therefor of that class in which means are provided for preventing the toe-calk of the shoe from becoming caught in cable-slots, between paving-stones, and in similar narrow openings.

The horse lifts the heel of the hoof first in raising the foot, the hoof thus rotating about the toe until the same is lifted from the ground. In consequence if the toe-calk extend into a narrow opening, as a cable-slot, the movement of the hoof exerts a wrenching or twisting effect upon the shoe, thus pulling the shoe from the hoof and oftentimes breaking the horse's leg and causing other serious accident.

In accordance with the present invention the ends of the toe-calk are bent or extended transversely to the middle or body portion thereof, so that a lateral dimension is imparted to the calk such that the same is prevented from entering the slots of cable-roads and other narrow crevices. The edge of the calk is sharp, as usual, so that the calk has all of the advantages of the old form as to its property of engaging the road-bed.

I am aware that it has been proposed heretofore to provide a toe-calk with a projection extending forward from the middle of the toe-calk to prevent the calk from entering cable-slots, (Letters Patent No. 350,441, dated October 5, 1886;) also, that a toe-calk has been provided with a projection extending to the rear from the middle of the calk for a similar purpose. (Letters Patent No. 428,117, dated May 20, 1890.) I consider it novel, however, to provide a toe-calk formed like the ordinary toe-calks from a straight bar of metal, the ends being bent to extend toward the rear when the calk is on the shoe to present a total lateral dimension that will prevent the calk from entering narrow crevices. Ordinary toe-calks are made by cutting pieces of the desired length from a long bar of metal which has been previously formed into the proper cross-section. The toe-calks of the present invention are formed in the same manner by cutting somewhat longer lengths from the bar of metal having the desired cross-section, after which, or by the same machine that does the cutting, the ends are bent to complete the calk. The calks thus formed have the further advantage that, like the ordinary straight calk, they can be redrawn or sharpened from time to time while on the shoe, and when considerably worn a new calk can be welded directly upon the former calk.

I have illustrated my invention in the accompanying drawings, in which—

Figure 1 is a view of the toe-calk of my invention. Fig. 2 is a reverse view thereof. Fig. 3 is a view of a horseshoe embodying my invention. Fig. 4 is a side view of the end of the horseshoe. Fig. 5 is an end view of the horseshoe.

Like letters refer to like parts in the several figures.

The toe-calk $a$ is provided with transversely-extending ends $a'$ $a'$, thus imparting a considerable lateral dimension to the calk greater than the width of cable-slots and the crevices in the roadway in which the calk is liable to become caught. The engaging edge of the calk is sharpened, so that the same may take firm hold upon the roadway. Upon the upper edge of the calk is provided the usual projecting lug or point $a^2$ for entering the horseshoe to which the calk is to be welded.

In Fig. 3 the calk is illustrated in position on the shoe $b$, the middle portion of the calk occupying the position of the ordinary calks heretofore in use, while the ends $a'$ $a'$ extend transversely thereto.

The calk may be of any desired shape having the requisite lateral dimension, and the precise form illustrated, though preferable, is not essential. The calks may be made of any size to suit shoes of different sizes and shapes and may be supplied to the trade as a separate article of manufacture to be placed upon the shoe by the blacksmith.

The peculiar form of the calk possesses advantages for draft purposes over the usual straight calk, as it more firmly engages the roadway and is particulary adapted for travel upon ice.

Having described my invention, what I claim as new, and desire to secure by Letters Patent, is—

1. As a new article of manufacture, a toe-calk for horseshoes formed from a single bar of weldable metal, both of the ends thereof being bent to extend obliquely toward the rear when the calk is on the shoe and forming part of the tread, the calk being broad at the base and adapted to be welded to the shoe and sharpened at the opposite edge or tread, whereby a toe-calk having all of the characteristics and advantages of the ordinary form of calk is provided, while the calk is prevented from entering narrow crevices, substantially as described.

2. The combination with a horseshoe, of a toe-calk welded thereon and broad at the base and sharpened at the opposite edge or tread, both of the ends thereof being bent to extend obliquely toward the rear of the shoe and forming part of the tread, whereby the toe-calk is prevented from entering narrow crevices, while the calk possesses all of the advantages of the ordinary straight calks as regards resetting and sharpening, substantially as described.

In witness whereof I hereunto subscribe my name this 16th day of July, A. D. 1896.

WILLIAM H. DAVIES.

Witnesses:
JOHN GLEASON,
W. CLYDE JONES.